United States Patent

Raczynski et al.

[15] 3,692,962

[45] Sept. 19, 1972

[54] SIMULTANEOUS CALL TELEPHONE EQUIPMENT TEST SYSTEM

[72] Inventors: John R. Raczynski; Mitch Silkaitis, both of Chicago, Ill.

[73] Assignee: GTE Automatic Electric Laboratories Incorporated, Northlake, Ill.

[22] Filed: Jan. 11, 1971

[21] Appl. No.: 105,506

[52] U.S. Cl. ............................179/175.2 R, 179/90 B

[51] Int. Cl. ............................H04m 3/26, H04m 1/42

[58] Field of Search .........179/90 B, 90 BD, 90 AD, 179/175.2 R, 175.2 M, 175.2 S, 175.2 A

[56] References Cited

UNITED STATES PATENTS

| | | | |
|---|---|---|---|
| 3,366,747 | 1/1968 | Holzer | 179/90 B |
| 2,697,140 | 12/1954 | Cornell et al. | 179/175.2 R |
| 3,062,921 | 11/1962 | White | 179/90 B |
| 3,069,512 | 12/1962 | McAllister | 179/175.2 R |
| 2,771,519 | 11/1956 | Nance | 179/175.2 M |

*Primary Examiner*—William C. Cooper
*Assistant Examiner*—Douglas W. Olms
*Attorney*—Theodore C. Jay, Jr., K. Mullerheim and B. E. Franz

[57] ABSTRACT

An automatic dialing test system is disclosed wherein electrical signals such as pulses or tones representing each of the digits of a call number are applied to a selected group of communication lines of a telephone system. The digits to be applied to each line are selected on a diode plug board program field. The manner of signaling, dial pulse or multi-frequency tone is selected by an enabling switch that connects the multi-frequency applying relays and a diode decoder or, a dial pulse applying relay and associated diode decoder, to the program field. The duration of the pulses is determined by pulse generators driven from a common clock source.

10 Claims, 14 Drawing Figures

INVENTORS
JOHN K. RACZYNSKI
MITCH SILKAITIS

BY

Bernard E. Franz

ATTORNEY

SCANNING MODES

PATENTED SEP 19 1972 3,692,962

SHEET 12 OF 12

SIMULTANEOUS CALL TELEPHONE EQUIPMENT TEST SYSTEM

BACKGROUND OF THE INVENTION

1. Field of the Invention

This invention relates generally to telephone communication system, and more particularly to a device for facilitating the testing of telephone switchboard equipment through the simultaneous, and repeated automatic application of a plurality of calls thereto.

2. Description of the Prior Art

The normal procedure for checking out telephone switchboard equipment after installation consists of placing a large number of calls therethrough, to determine that it is operating properly. This procedure entails a large number of personnel and time if it is to be performed properly. As a consequence automatic dialers are available commercially to dial calls through the switchboard for these testing purposes. A typical such device is disclosed in U.S. Pat. No. 3,239,612 issued Mar. 8, 1966 to H. E. McAllister.

However, as is well known, many exchanges are now equipped for tone dialing as well as pulse dialing and it therefore becomes necessary to provide equipment capable of providing this additional feature as well as increased flexibility of use and speed of operation.

SUMMARY OF THE INVENTION

Accordingly it is an object of the present invention to provide a device for simultaneously loading a plurality of calls into a telephone exchange.

It is another object of this invention to provide a device for simultaneously outpulsing the call digits in a fully automatic manner on to the terminals of the plurality of connected lines.

It is a further object of this invention to provide a device capable of outpulsing the plurality of call numbers represented by multi-frequency tones.

It is still another object of this invention to provide an improved digit selection arrangement usable for either dial pulse or multi-frequency signaling.

BRIEF DESCRIPTION OF THE DRAWINGS

The above mentioned objects and other features of the invention and the manner of obtaining them will become more apparent, and the invention itself will be best understood by reference to the following description of an embodiment of the invention taken in conjunction with the accompanying drawings, in which.

DESCRIPTION

Figure 1:
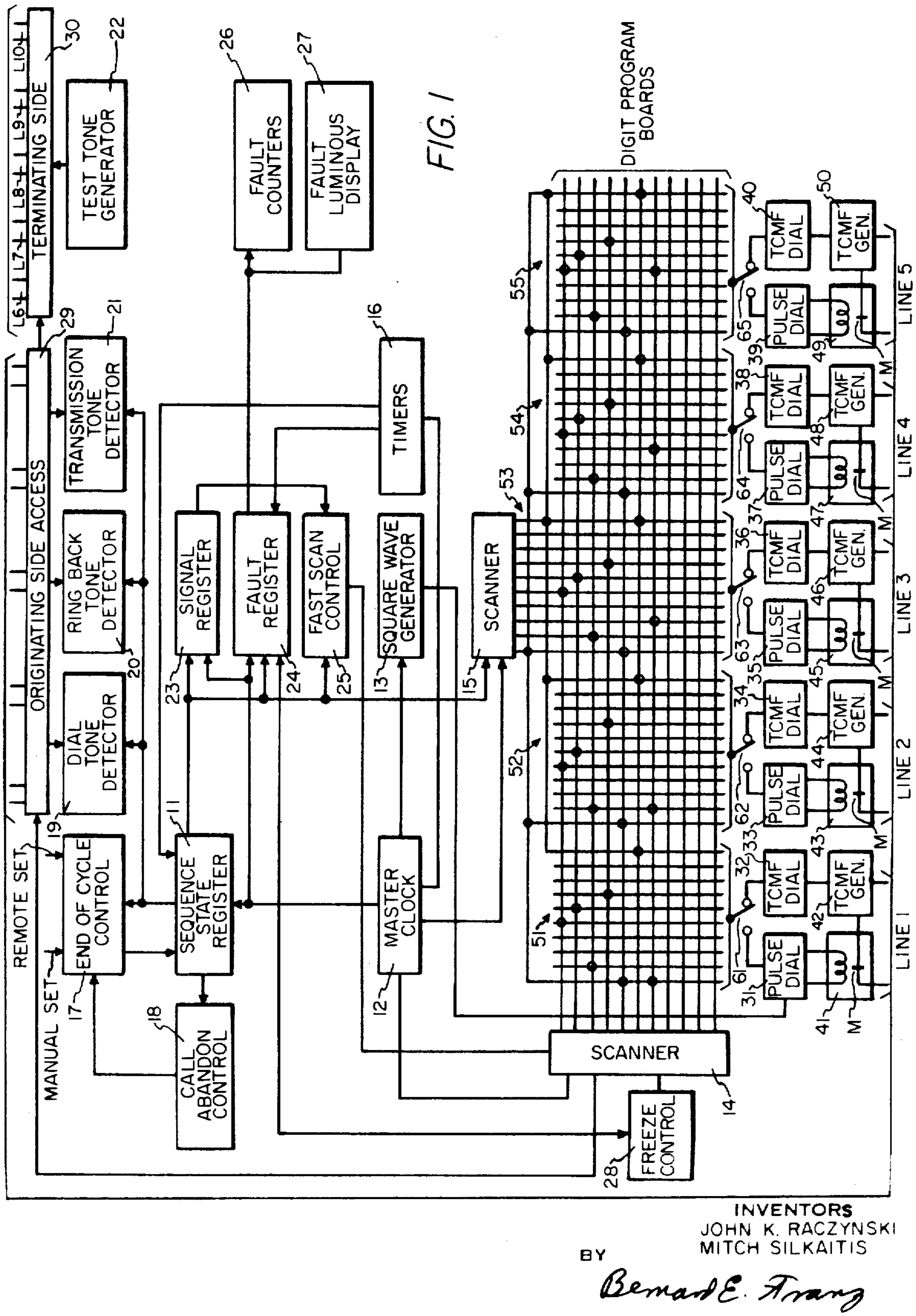
FIG. 1 shows in block diagram form the functional circuit configuration of the automatic dialer.

Electronic logic circuits are used in the system described herein and employ as standard building blocks NAND gates. A NAND circuit is an arrangement having at least two inputs for receiving bivalent input signals and an output for supplying a bivalent output signal. A circuit of this type supplies an output signal of the value 0 when all input signals have the value 1 and an output signal of the value 1 when at least one of the input signals has the value 0. The circuit components have functional designations and are prefixed by the drawing figure when referred to in the specification to facilitate the finding of these on the drawings.

Referring to the general block diagram of the present invention illustrated in FIG. 1, the essential functional circuit subgroups of the system will first be described. They are a sequence state register 11, which consists of 5 shift registers that control the 5 sequence states of the circuit. The states are:

1. Origination (off-hook).
2. Dial tone test, during which the originating lines are tested for the presence of dial tone.
3. Dialing, during which the digits programmed on the digit program boards are sent into the originating outlets of the exchange either in multi-frequency or pulse dialing mode.
4. Ring back tone test, during which the originating lines are tested for the presence of a ring back tone.
5. Transmission tone test, during which the originating lines are checked for the presence thereon of the transmission tone applied on the terminating lines from the test tone generator.

The master clock 12 is a basic 500 KHz clock for generating four staggered square wave trains, 2 μs "on" and 6 μs "off."

The square wave generator 13 is a pulse divider and provides the fundamental square wave of 40ms "on" and 60ms "off" for pulse dialing.

The scanner 14 is also a pulse divider and provides the scan pulses to the program field for the generation of dial pulses.

The scanner 15 is also a pulse divider and provides the scan pulses to the program field for the generation of the pulse dialing interval for each digit and the interdigital pause.

The timer 16 is a pulse divider having a plurality of outputs which are selectively used for timing the duration of the sequence states and fault detection operations.

The end of the cycle control 17 controls the end of the test as determined by the control settings.

The call abandon control 18 permits the return of the initial state from any sequence state after any selected digit in dialing.

The dial-tone detector 19, the ring-back-tone detector 20 and the transmission-tone detector 21 are circuits of the type disclosed in the patent application of V. F. Weber, Ser. No. 80,001 filed Oct. 12, 1970, issued Jan. 25, 1972 as U.S. Pat. No. 3,638,038 and are used to test the lines for the presence of the respective tones on the originating lines.

The test tone generator 22 generates the transmission tone of 1,000 Hz for application to the terminating lines. The signal register 23 and the fault register 24 are each a 5 latch memory to record the positive and the negative outcome respectively of a test on each of 5 lines. They are reset at the end of each sequence state. The fast scan control 25 provides for an accelerated testing sequence of the lines.

The fault counters 26 consist of a counter associated with each line, for counting the total number of faults detected during the testing cycle.

The fault luminous display 27 identifies the type of fault detected on each line.

The freeze control 28 when set provides for the stopping of the test cycle at the time a fault is detected. The originating side access 29 and the terminating side access 30 are units for providing on-hook and off-hook control for each of the connected test lines, the originating lines 1 through 5 and the terminating lines 6 through 10 respectively.

The pulse dial decoding units 31, 33, 35, 37 and 39 with their associated pulsing relays 41, 43,45, 47 and 49 having the pulsing contacts M as well as the touch calling multi-frequency decoders 32, 34, 36, 38 and 40 with their associated multi-frequency generators 42, 44, 46, 48 and 50 are respectively associated with each of the originating lines 1 through 5 as well as with a respective one of the digit program boards 51, 52, 53, 54 and 55. Either the pulse dial or the multi-frequency dial equipment is connected to the digit program board by means of a transfer switch having the transfer contact sets 61, 62, 63, 64 and 65 for lines 1 through 5.

PREPARATION OF OPERATION

Figure 2:
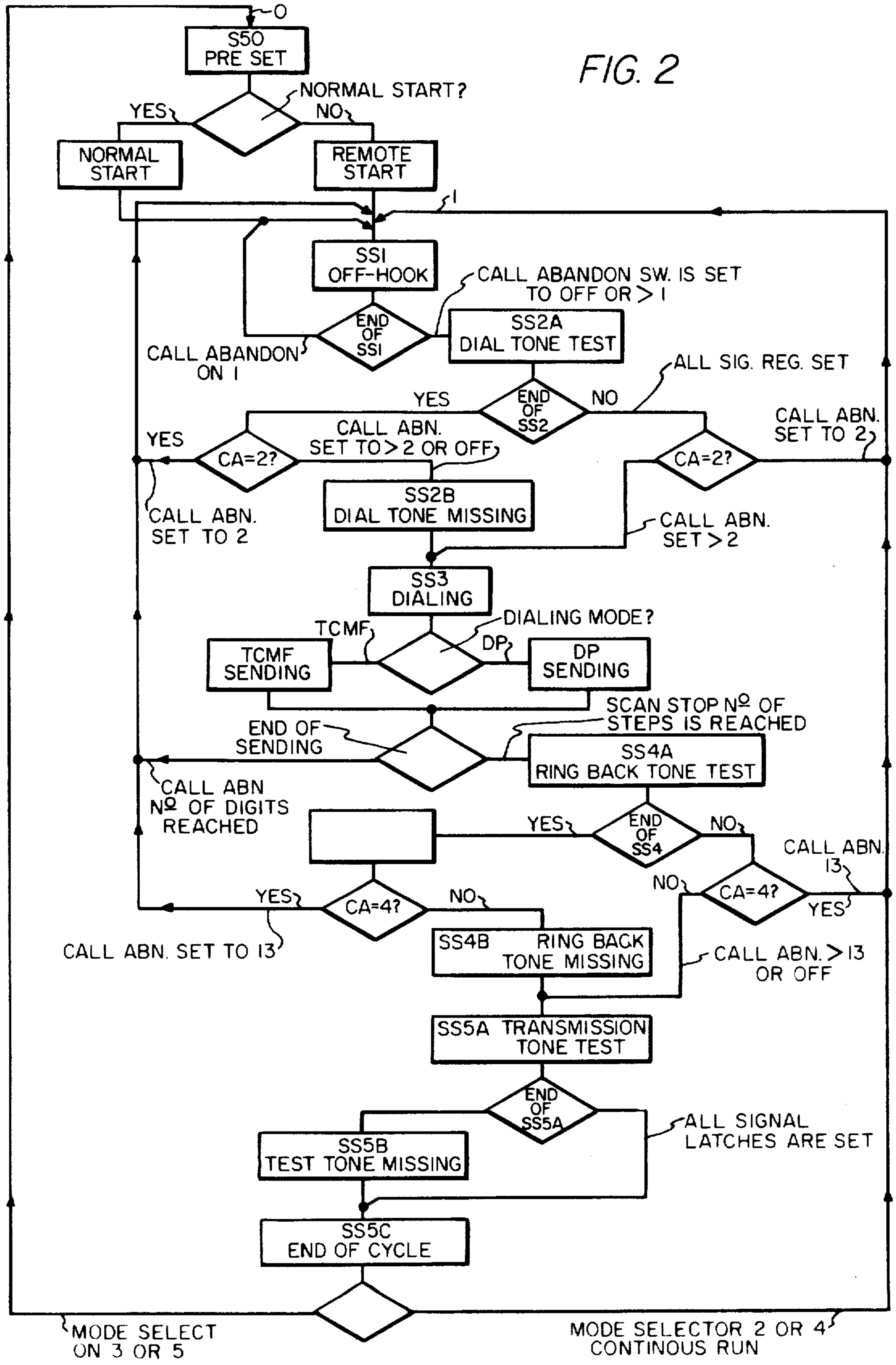
FIG. 2 is a flow chart of the operation of the automatic dialer.
Figure 3:
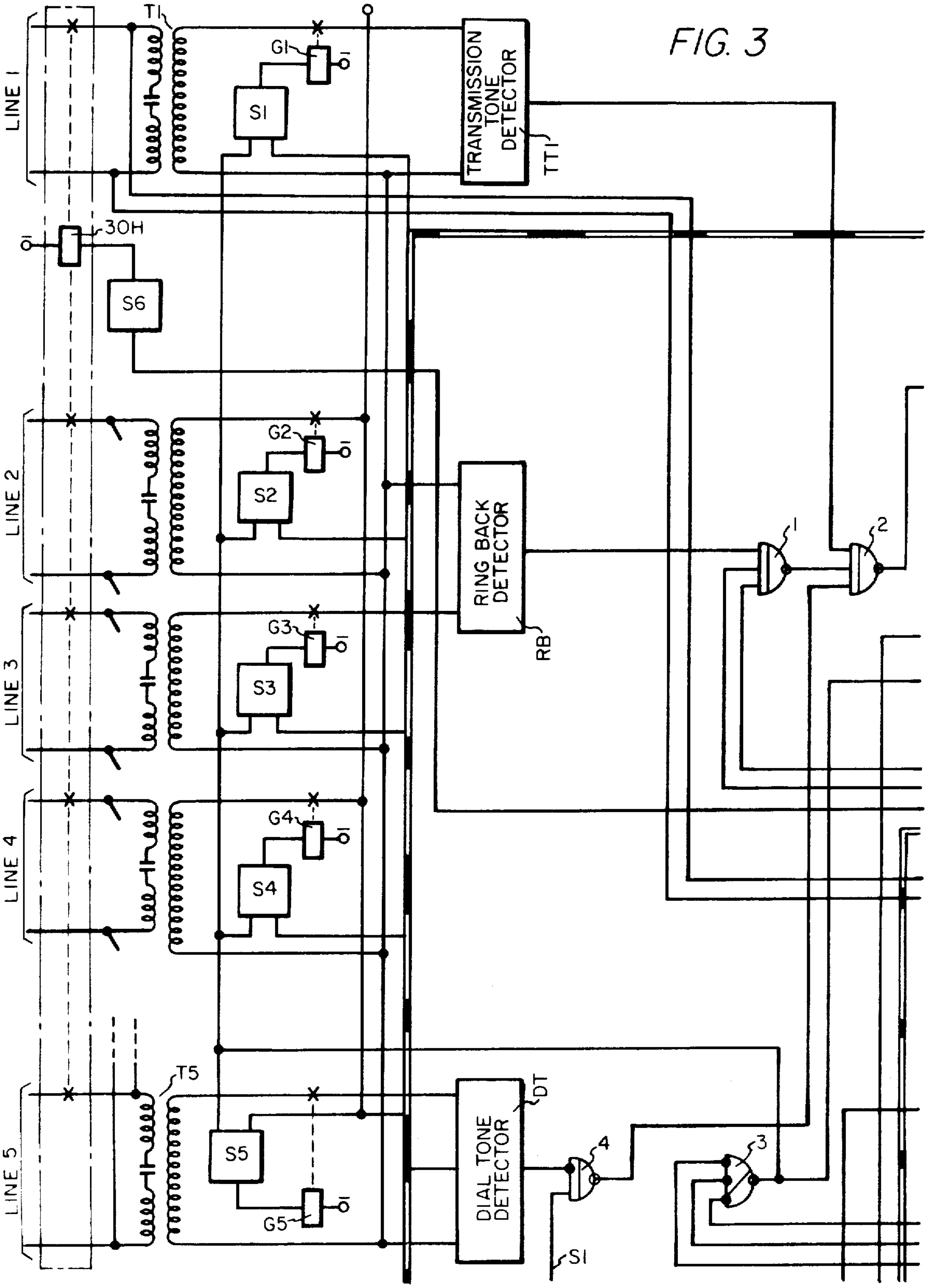
FIGS. 3–9 when arranged as shown in FIG. 14 disclose a schematic of the automatic dialer.
Figure 4:
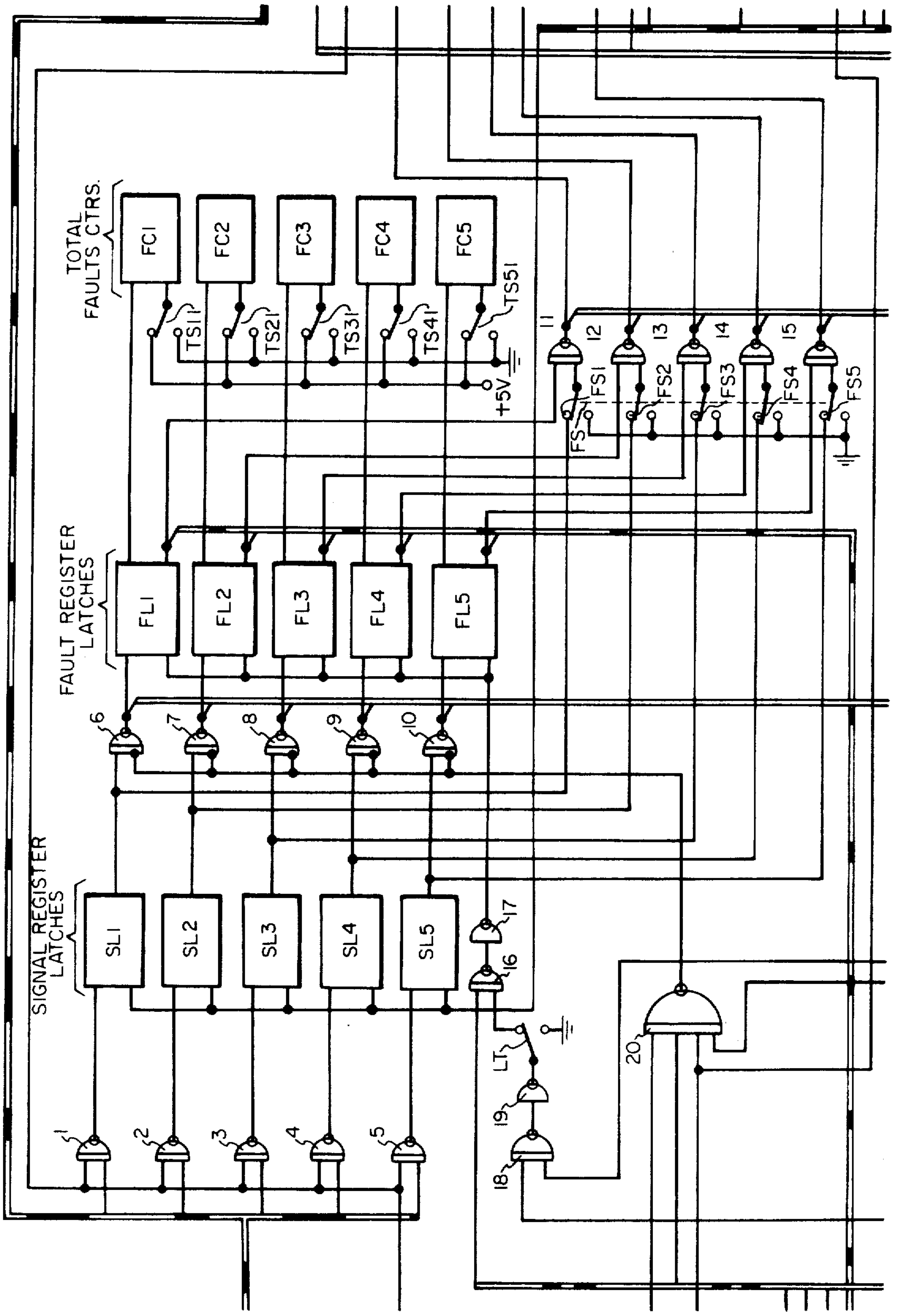
Figure 7:
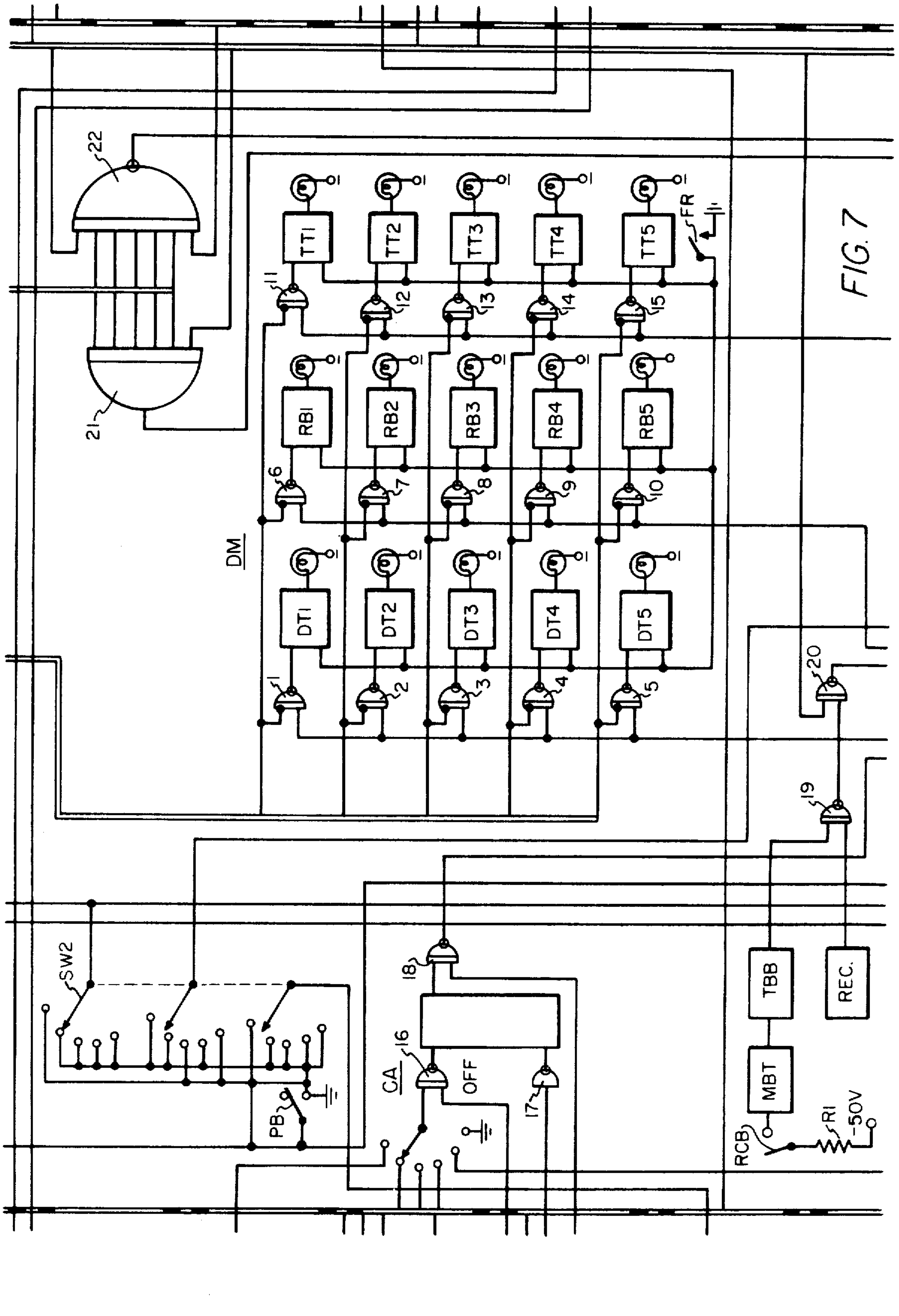
Figure 8:
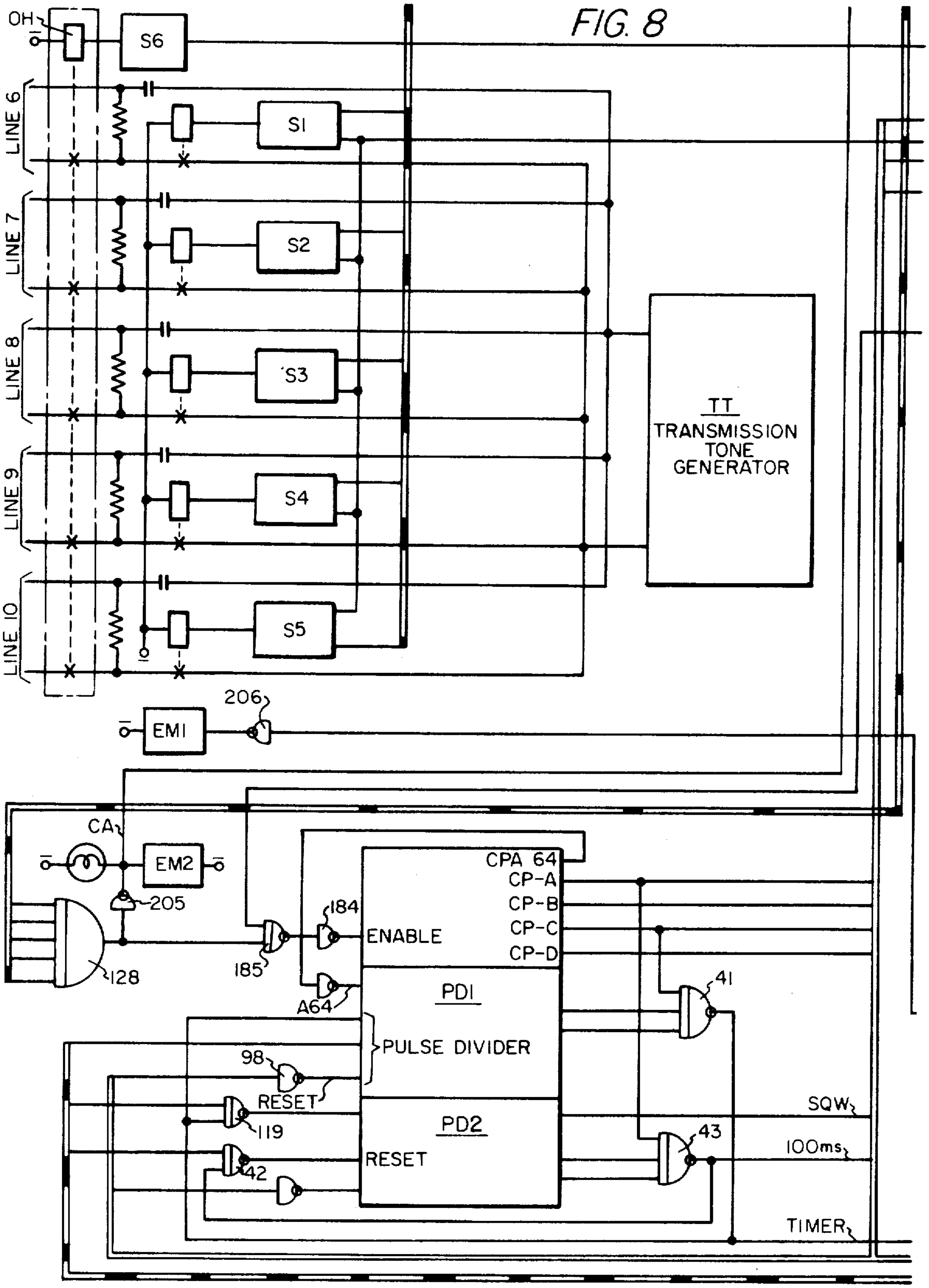
Figure 9:
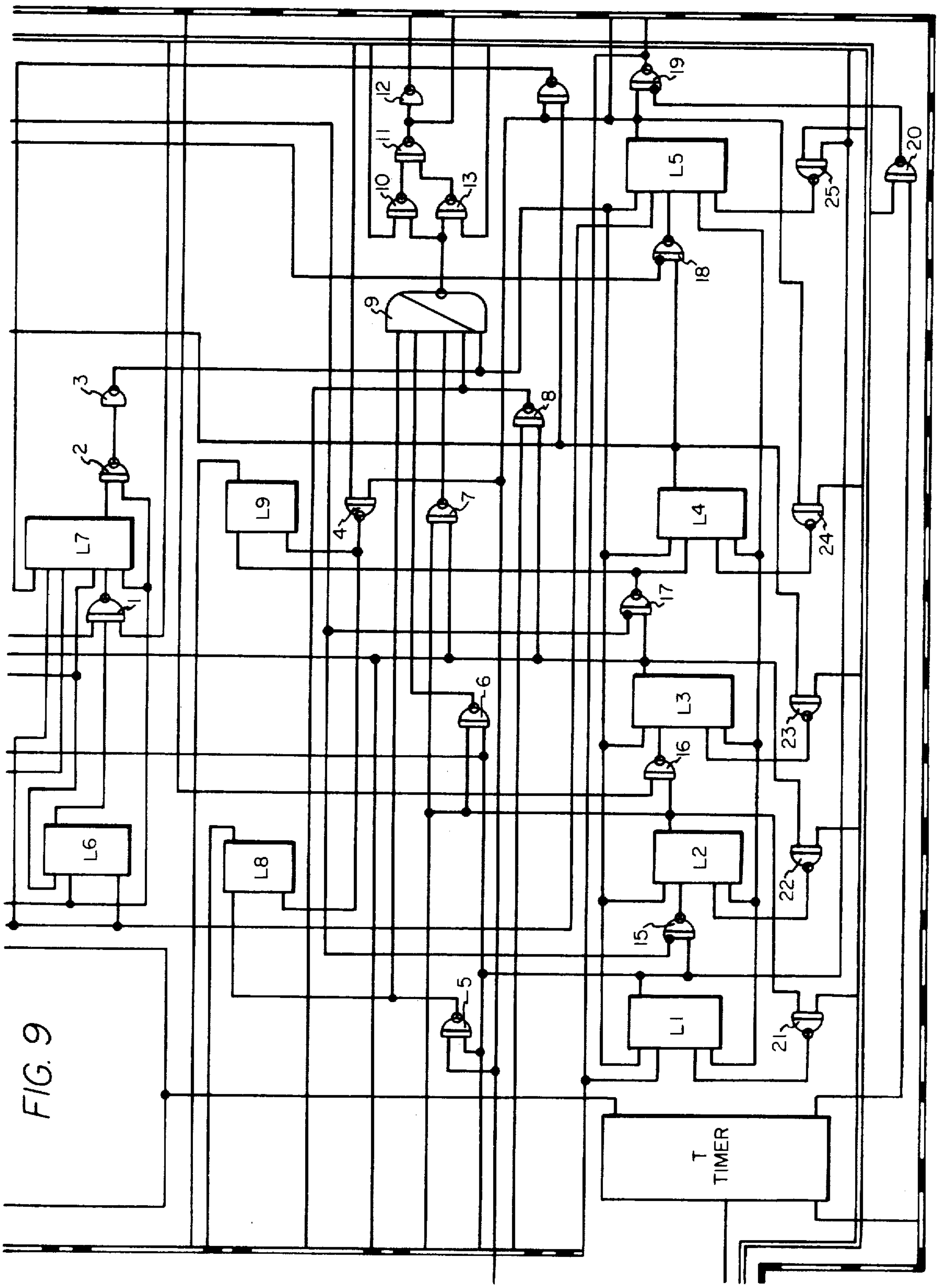

For the purpose of following the functional operation of this system reference may be had to the flow chart of FIG. 2. On this flow chart the first box at the top of the page is labeled preset. The equipment is initially set for operation at this time. The operation of the operator to preset the equipment involves connecting it to a source of power and setting the mode select switch SW2 located on FIG. 7 to position 1 which will reset the electronic logic. On FIG. 4 are located five boxes labeled total faults counters FC1 through FC5. These consist of peg type counters and are reset by having a momentary contact TS11–TS51 associated with each counter pressed in. Also on FIG. 7 are located a series of 15 lamps labeled DT1 through DT5, RB1 through RB5 and TT1 through TT5. These lamps indicate the type of fault; dial tone missing, ring back tone missing or transmission tone missing for each of the five lines that are being tested. They are reset by pushing the button labeled FR, fault reset. The operator has also to connect the five call originating test line terminations 1 through 5 shown on FIG. 3 to the five lines selected for testing on the switching equipment and the five lines 6–10 for call terminating on FIG. 8. The next operation would be to set the call-abandon switch CA on FIG. 7 for the type of operation desired. The first position labeled Off will provide a full test cycle for the lines; set to the second position labeled "1" the call will be abandoned after the off-hook operation. If set to the position labeled "2" it will be abandoned after the dial tone test. If set to position "3" the call will then be abandoned after the dialing operation, and if set to position "4" it will be abandoned after the ring back tone test. Next the operator has to return to the mode select switch SW2 and move it from the first or reset position to one of the following positions. If he desires a single test and to stop at the fault, he will set the switch to position 3. If he desires the test to be run continuously and merely record the faults without stopping, he will set it to position 4. If he desires a single test to be run and merely record the fault, he will set it to position 5. Next the manner of dialing must be selected, that is dial pulse or multi-frequency dialing. For pulse dialing the manual switch SW1 is operated to its second position, on the drawings it is shown in the position for MF dialing, enabling the electronic battery switches along the top of the matrix as well as the electronic ground switches along the left side of the matrix.

Switch SW1 as shown has eight sets of contacts. The first set SW1–1 on FIG. 6 enables the main battery switches MBS1–MBS10 by connecting the enabling gates to the sequence control circuit. The second set SW1–2 on FIG. 5 connects the clock input of the vertical or digit scanner SC2 to the 15th step output of the horizontal or pulse scanner SC1.

Figure 5:
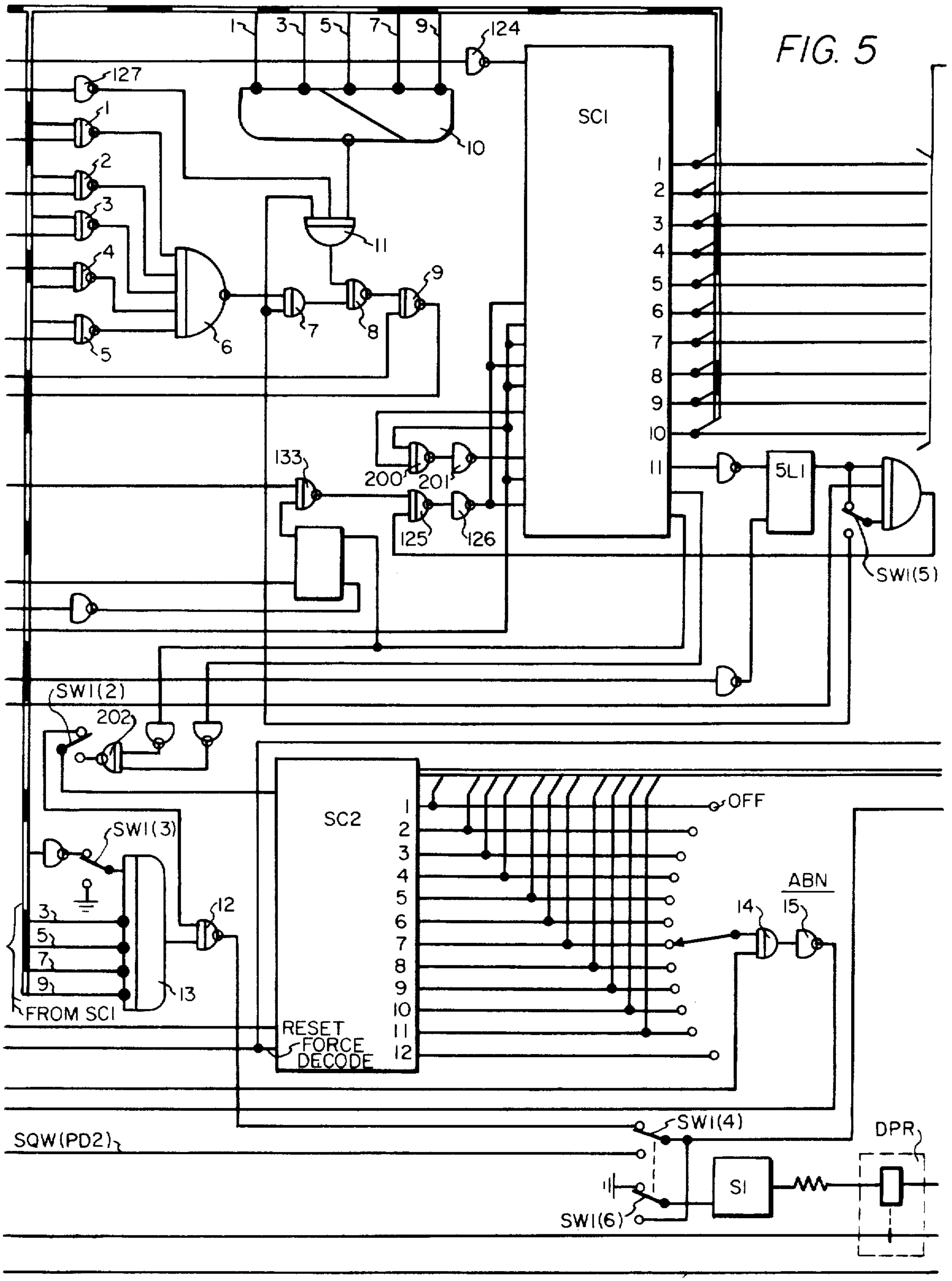

The third set SW1–3 on FIG. 5 connects the inverted first pulse of the horizontal scanner SC1 output to the input of the digit scanner SC2.

The four set SW1–4 on FIG. 5 connects a 40ms square word pulse SQW to the main ground switches MGS1–MGS11. The fifth set SW1–5 on FIG. 5 connects the output of latch 5L1 to the second input of gate 56 to set the scanner SC1.

Figure 6:
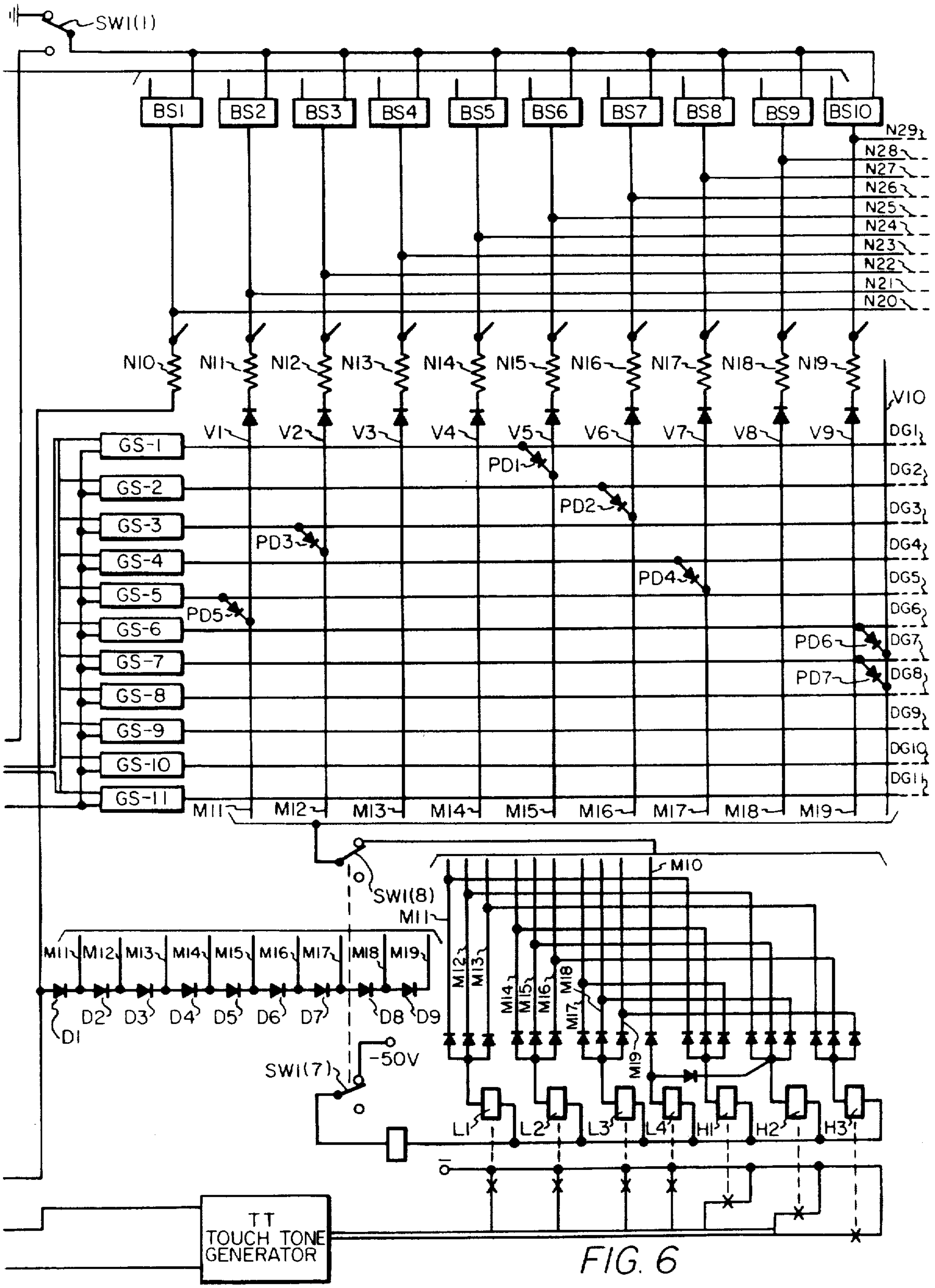

For TCMF dialing only the switches along the left side of the selection matrix of FIG. 6 are enabled. These are connected in sequence to the sequential pulse output of the pulse generator SC2 which puts out, on each of the series of outputs, a 100 millisecond pulse followed by a 100 millisecond off period. At the matrix, the first pulse is applied to the ground switch MGS1 to place a ground potential on the top or first horizontal of the matrix. This ground potential is passed through the diode inserted at the selected intersection corresponding to the digit value selected to, in this instance, lead M12 and through the blocking diodes connected to the windings of relays L11 and H12 to control the application of the first line frequency and second high frequency to the line. The other terminals of the windings of these relays are connected in series with the winding of relay HL1 and the switch contacts SW1–7 to a negative battery potential. Each of the relays HL1, H12 and L11 are operated during the interval of the 100 millisecond ground pulse. The contacts of these relays respectively enable the touch tone generator unit and the low frequency one output and the high frequency two output, which frequencies correspond to the signal for a digit 2.

Figure 10:
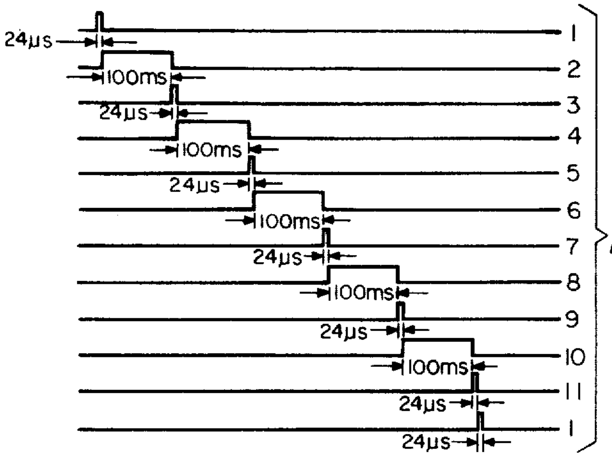
FIG. 10 is a chart showing the output of a first scanner SC1 during the scanning operation.
Figure 11:
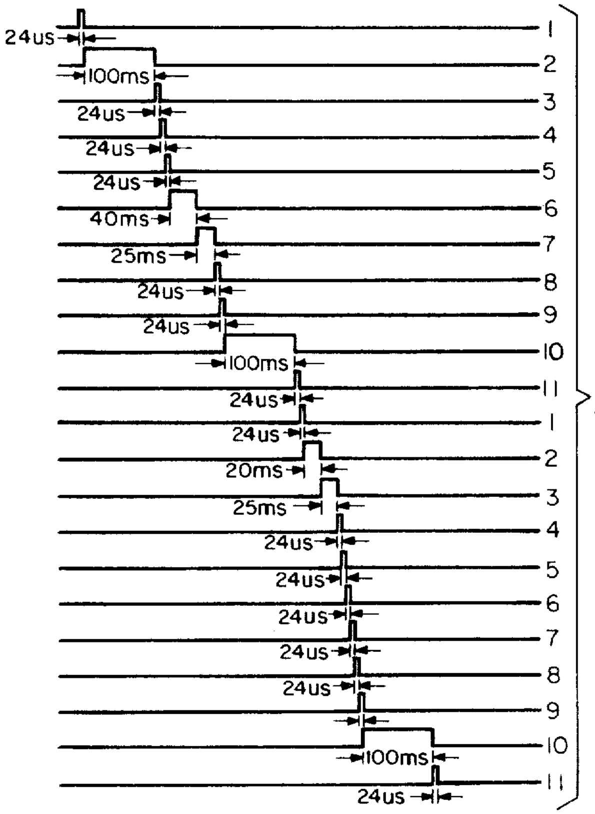
FIG. 11 is a chart showing the output of the second scanner SC2 during the scanning operation.
Figure 14:
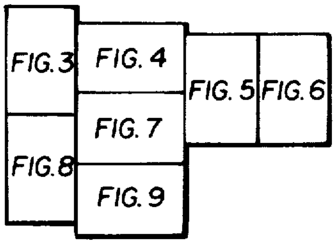
FIG. 14 is a diagram showing how FIGS. 3–9 may be arranged to form a unitary disclosure.

Similarly during the second pulse, ground switch MGS–2 is enabled to apply a ground pulse to the second horizontal. This time there is shown a diode connecting this horizontal to vertical M13. And a similar operation results in the frequencies corresponding to digit 3 being applied to the line. Reference may be had to "Notes on Distance Dialing" by the American Telephone and Telegraph Company, 1968 ed., Section 4, Signaling for details of the frequencies used and the signaling standards. Specific reference is made to page 26, Table 2, for the multi-frequency signaling and to pages 8–11 for the dial pulse signaling. The only other operation remaining before pushing the start button PB on FIG. 2 to initiate the operation of the machine is to program the digits that are to be dialed into the individual lines. This is accomplished by inserting a diode plug into the hole at the intersection of the program plug board corresponding to the digit value and position in the called number as shown in FIG. 6. With these preparations completed the circuit is ready to start testing the lines. This is accomplished in one of three ways. As shown in FIG. 7 at the bottom of the page a −50 volts through 1,000 ohm resistor R1 is connected to a remote control push button RCB. This push button upon being operated extends this potential to a box indicated as MBT and a second box in series TBB. These boxes convert the voltage supplied from the push button to a level usable by the logic gate 7–19 of the equipment. Also connected to this same gate 7–19 is another lead labeled REC. This is for use by a remote control computer for initiating the dialer operation. When a positive signal is supplied from either one of these to gate 7–19 this signal passing through gate 7–20 presents a positive signal to the reset input of latch L7. Going back, however, it is recalled that prior to starting the operation switch SW2 was set to position 1. In this position ground potential is available through level 1 to latch 9L5 set input. This is the normal state of the sequence control where latches 9L1, 9L2, 9L3 and 9L4 are in the reset state while 9L5 is in the set state. However, after the switch SW2 is moved to a second position, for example, position 4, which is equivalent to the automatic mode for continuous running of the test, the machine is ready to start and will start when the D clock pulse enters through gate 25 to reset latch 9L5. For a moment both latches 9L1 and 9L5 are set. This condition is sensed at gate 9–5. The output of gate 9–5 is connected to the input of gate 9—9 which is an OR gate and on the following B or D clock pulse through gates 9–10 or 9–13 and 9–11 and 9–12 will effectively reset the scanners SC1 and SC2. With the setting of latch 9L1, the machine is effectively in sequence state 1 and the output of latch 9L1 is connected to latch 9L8 which is set and whose output now serves to close the loop of lines L1 through L5 at the relay operated from the driver 3D6. The closing of the loop simulates the off-hook condition, and this is followed by operators from the output of latch 1 being connected to gate 3—3 whose output prepares drivers SD1 through SD5 to operate relays G1 through G5 to connect the lines L1 through L5 to the dial tone detector 3D6. A second input of driver SD1 is connected to the scanner SC1 output 2. This output shown on the chart of FIG. 10 consists of a series of 100 millisecond pulses. It serves to fully enable the switch SD1 to operate the relay G1 for the necessary interval to detect the tone's presence. Also enabled from latch 9L1 is gate 3–4 from the output of the dial tone detector. This output from gate 3–4 inverted through gate 3–2 is then connected in multiples, the inputs of gates 4–1 through 4–5 where along with an output of the scanner SC1 for the appropriate intervals enable the signal register latches SL1 through SL5. A proper response from a dial tone detector will set the latch corresponding to the line under test.

The originating line termination of the equipment has a pair of conductors for each line and one conductor that includes a make contact of a relay 3 OH. After passing through this make contact both conductors terminate on the terminals of a transformer 3T1–3T5 that includes a capacitor between the two halves of its winding for coupling to the tone detectors. Also attached to the two conductors at the transformer terminals is a DC shunt path for providing the OFF hook condition that passes through the touch tone generator a pair of resistors and a contact of the pulsing relay. On the other side, of each line's individual transformer, there may be seen a multiple connection to a dial tone detector 3DT, a ring back detector 3RB, and a transmission tone detector 3TT. The connections to these detectors are controlled by a driver 3SD1–3SD5 and relay 3G1–3G5 that opens or closes the contacts to connect the individual lines to the detectors. These individual drivers for connecting the line are enabled from a gate 3—3 that is in turn controlled by the outputs of latches 9L, 9L3 or 9L4 of the sequence register. Thus the relays 3G1 through 3G5 are prepared for operation during the proper time slots during the sequence states 1, 3 and 4 for connection of the dial tone detector 3DT, ring back tone detector 3RB, and the transmission tone detector 3TT, respectively. Each of the tone detectors such as the dial tone detector 3DT upon detecting an output from the line during the interval assigned to the line presents an enabling to a gate which is also enabled during the proper sequence state such as gate 3–4 which is enabled during sequence state 1 to go through the gate 3–2 whose output is then multipled to the 5 signal register latches 4SL1–4SL5, each of these latches is enabled during the interval associated with a particular one of the lines 1 through 5. The setting of these signal register latches indicates that the test was successfully accomplished for that subscriber line. Connected in multiple to all of the latches at the reset input is a switch 4LT for resetting the latches upon the completion of each test. This reset mechanism consists of an OR gate 9—9 with inputs connected to the outputs of the change of sequence state indicating gates 9–5, 9–6, 9–7 and 9–8 following the sequence state latches 9L1, 9L2, 9L3 and 9L4 and also from gate 3—3 which is responsive to a manual reset operation. Any-one of these inputs is then coupled to the two gates 9–10 and 9–13 which also have respectively the B and D clock pulses connected to them and upon either the B or D clock pulse appearing it will produce an output to gate 3–11 which is inverted by gate 3–12 and applied to reset the signal latches 4SL1 through 4SL5. If a test on a particular line is not successful the latch corresponding to that line such as the signal register latch 4SL1 will not be set. This will result in a positive output remaining at the lower output lead of the latch since it is still in the reset state. This output of each of the signal register latches is shown connected to a respective gate 9-6 through 4-8 and also to a contact of the transfer sets FS1 through FS5 of the fast scan switch FS. The gates FS1 through FS5 in addition to the output from the signal register latches are connected at their inputs to gate 4–20; gate 4–20 functions as an AND gate and has in addition to the D clock pulse an input from gate 3—3 which is a true or positive signal during the sequence state when the tests are made, an inverted input from latch 9L2 indicating that it is not in sequence state 2 and an input from the timer 9T. If a positive response is not received in an interval determined by the timer, the D clock pulse and a timer pulse will in the presence of the other signals cause a zero output from this gate which is inverted and causes positive output. This output in addition to the positive or reset condiction indicating output of the signal register latch to pass a true signal from this AND gate to set a corresponding one of the fault register latches FL1 through FL5. In addition to setting the fault register latches an output is also taken to a series of gates 7–1 through 7–15 corresponding to lines 1 through 5. These particular gates 7–1 through 7–15 then serve as drivers for the line fault indicators 7DT1 through 7DT5, 7RB1 through 7RB5, 7TT1 through 7TT5 for the dial tone missing registers, the ring-back tone missing registers and the transmission tone missing registers respectively to register the particular fault associated with that line by their connections. For example for a fault on line 1, the gates 7–1, 7–6, and 7–11 would have an enabling potential on one of their inputs. Each of these gates then has another input from the sequence state register such as from sequence state latch 9L1 to gates 7–1 through 7–5, sequence state latch 9L3 to gates 7–6 through 7–10 and sequence state latch 9L4 to gates 7–11 through 7–16. If a fault was registered on line 1 during sequence state 1 the negative input from gate 4–6 and the sequence state 1 indication to gate 7–1 would serve to set latch 7DT1 and light the associated lamp to indicate a dial tone missing fault for line 1. The same would happen on gates 7–2, 7–3, 7–4 and 7–5 for the lines 2 through 5 in setting latches 7DT2 through 7DT5 and their associated lamps. If this fault occurred during sequence state 3 latches 7RB1 through 7RB5 would be set indicating a ring back tone missing or if this occurred during sequence state 4 latches 7TT1 through 7TT5 would be set indicating transmission tone missing. The reset input of all of these latches is connected to a fault reset key labeled 7FR which when pressed will supply a ground to reset all of the latches. Another connection of the signal register latch outputs is to a contact of the fast scan switch 4FS, if the switch, 4FS, is set in its first position the armature spring is connected to ground, and the gates 4–11, 4–12, 4–13, 4–14 and 4–15 will not be enabled until a fault is registered.

Then upon completion of a scan of all of the lines, there will be a positive potential on the input leads from each of the fault latches since they were not set, to thus provide a one output at each of these gates 4–11 through 4–15. All of these gates outputs are then connected to each of the gates 7–21 and 7–22. The output of AND gate 7–22 inverted is then taken to the input of gate 9–15 between latch 9L1 and latch 9L2 of the sequence state register to advance the registration sequence state 2 by setting 9L2. If, however, the fast scan switch was set to its second position, an output from either the signal register latches 4SL1 through 4SL5 or the fault latches 4FL1 through 4FL5 will enable gates 4–11 through 4–15. The outputs are connected to the corresponding inputs of AND gates 5–1 through 5—5 where during the test interval for each particular one of the lines there is another input from the scanner to enable the corresponding gate and then an OR gate 5–6 will pass the output to AND gate 5–7 where during sequence states 1, 3, or 4 it will be further passed through gate 5–8; at gate 5–10 each of the five scanning control signals from scanner SC1 are connected as inputs and this with the input from gate 3—3 indicating that the system is in sequence state 1, 3 or 4 and a signal from gate 3–2 indicating that results have been obtained from the detectors enables gate 5–11 to pass a signal to 5–8 where the two signals are ANDed and passed to gate 5–9 where at the occurrence of the C clock pulse the output is taken to the pulse dividers 8PD1 and 8PD2 to accelerate them.

The basic scanning cycle is 100milliseconds during which the test is applied and 100 milliseconds during which the test is off. During each "on" interval one of the lines is connected to the selective detector. The scanning cycle is then shortened when the fast scan switch is in its second position. During the "on" period the output is monitored for a positive response and as soon as this response is recognized the corresponding signal register latch is set and the scan period is then terminated. The same action takes place if a fault latch is set during the test.

The fault latches also have a connection from their set output position to a series of five peg fault register counters 4FC1 through 4FC5. Upon the setting of any one of the fault register latches, a peg fault register is also set to record the number of times a fault has been detected for a particular line. Upon the completion of the sensing on each of the lines for the presence of dial tone and the output from gate 7–22 indicating that the test has been completed on all the lines, gate 9–15 is enabled and latch 9L2 is set, and the equipment now completes sequence state 2.

At this stage with both latches 9L1 and 9L2 of the sequence state registers set, the logic of gates 9—9, 9–10, 9–13, 9–11 and 9–12 is enabled during the clock pulse B or D to reset the pulse counters and signal registers. during sequence state 3 the dial operation of the automatic dialer takes place. The type of outpulsing that is to take place is dependent upon the setting of switch SW1. When this switch is set to the first position the equipment will outpulse the digits in a multi-frequency mode; when set to its second position the outpulsing will be in the serial dial pulse mode. With switch SW1 set to the dial pulse position the effect is to apply a sequence of pulses from the first scanner 5SC1 to each of the battery switches 6BS1 through 6BS10. These switches are respectively connected to the outputs 1 through 10 of scanner 5SC1. The other input of these switches is connected in multiple to the output of the latch 9L2 for sequence state 2 and are thus enabled to apply a battery potential during the interval when the pulse from the scanner 5SC1 is applied.

Along the left side of the matrix shown in FIG. 6 are another series of switches labeled GS1 through GS11. These eleven switches are respectively connected to the outputs of scanner 5SC2 numbered 1 through 11. The other input of each of these switches is shown connected through 5SW1–4 and to the dial pulse mode gate 5–13. When gate 5–13 is enabled from the outputs 1, 3, 5, 7, 9 from 5SC1, the signal is inverted at gate 5–12 and serves to enable all of the switches 6GS1 through 6GS11 and 5GS1 for dial pulsing.

Figure 12:
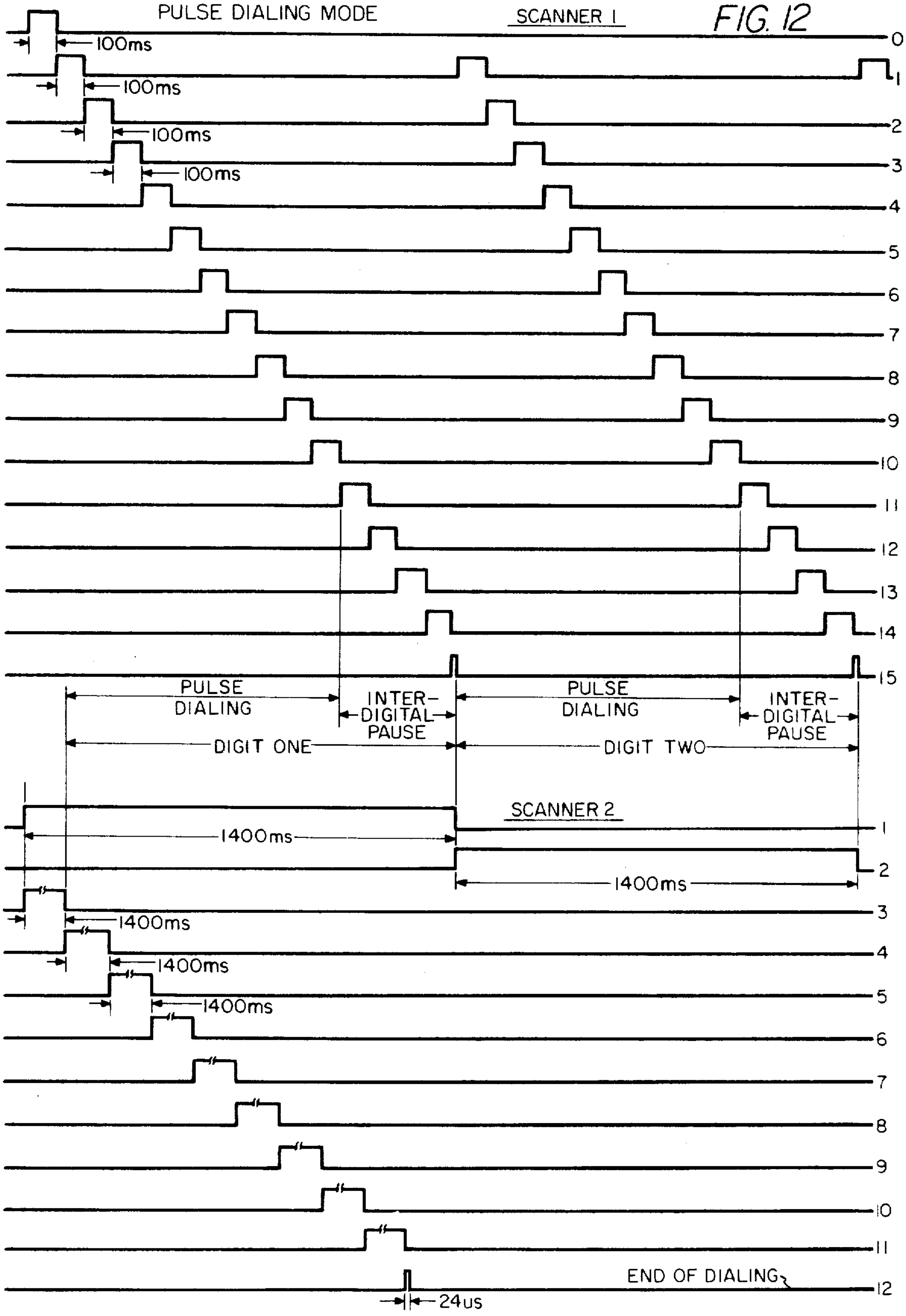
FIG. 12 is a chart showing the scanner outputs during the pulse dialing mode.
Figure 13:
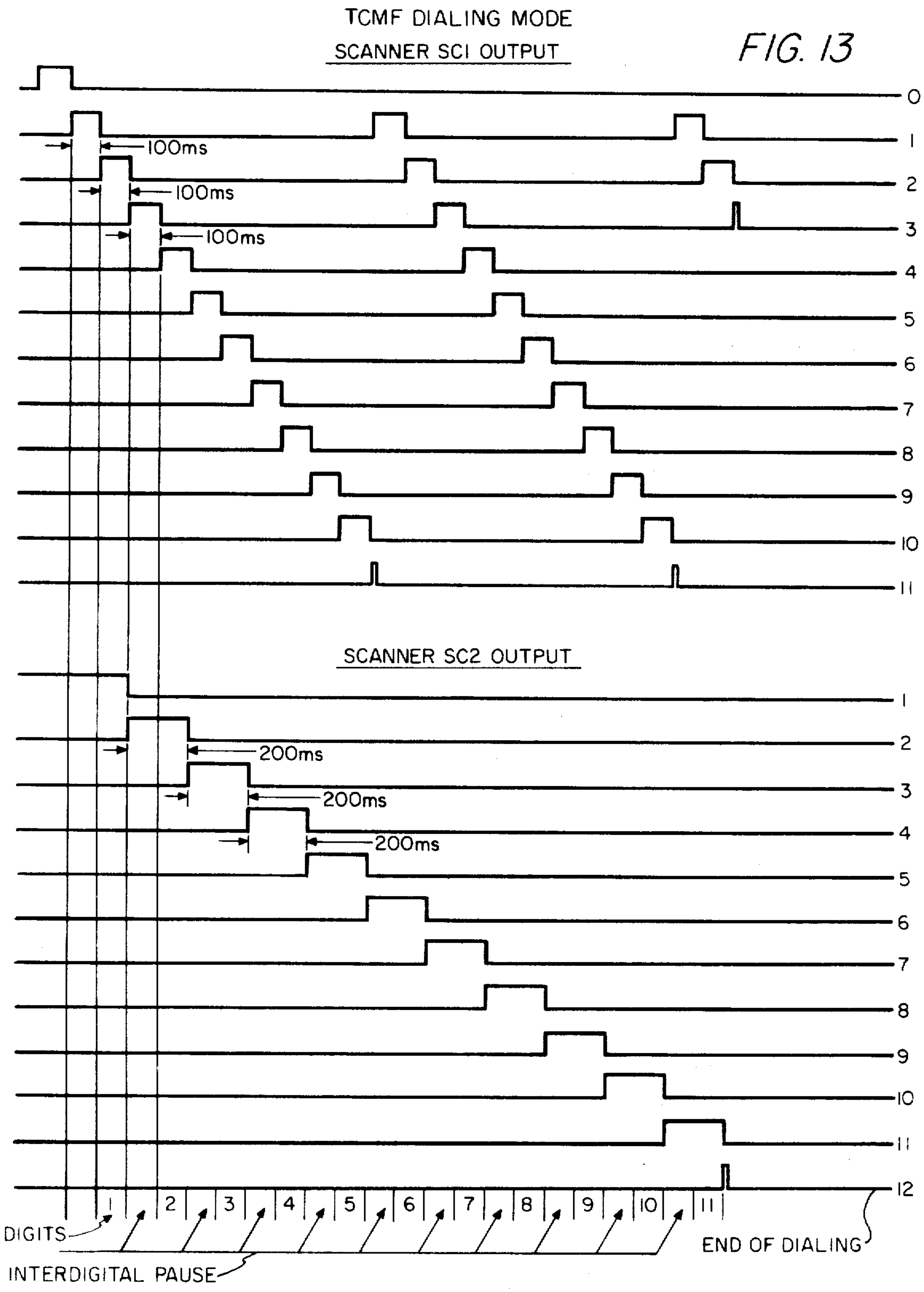
FIG. 13 is a chart showing the scanner outputs during the touch calling multi-frequency mode.

As may be seen from the chart of FIG. 12 the inputs to the top of this matrix each consist of a 100 millisecond interval to each of the switch drivers there shown. The inputs to the switch drivers on the left side of the matrix consist of an interval of 1,400 milliseconds for each switch driver, thus during the interval that switch 6GS–1 is enabled, it is possible to scan across all of the switches 6BS–1 through 6BS–10. In addition four intervals 11 through 14 are bypassed and serve as an interdigital pause. The matrix shown on FIG. 6 is arranged to outpulse the number 562–7100. As the first pulse is applied to 6BS1 and 6GS1 is enabled, a direct connection from terminal 6M1 to the dial pulse relay through the gate switch 5S1 and through the SW1–6 switch contacts to the 40 millisecond output of the square wave generator. This thus operates the dial pulse relay 6DPR for a 40 millisecond interval during which the line is open. During the next 60 milliseconds even though the pulse is present at the output of M1 because of the absence of a pulse on the other side of the pulsing relay, the pulsing relay remains unoperated. When the next pulse appears from the scanner 5SC1 there will be an output then through 6BS2 to the 6V1 lead which will then be passed through to the 6M11 terminal through the SW1–8 contacts through first diode 6D1 there shown to the pulsing relay again resulting in a second pulse being sent out on to the line. This type of operation will continue until the sixth pulse appears on 6BS6, its output will then be connected through the plug in diode PD1 shown, directly into the 6GS1 switch and thus be shunted out and not passed through to the dial pulsing relay. Depending upon where this dial plug is put in on the horizontal lead will determine the number of dial pulses that will continue for each of the horizontals and will thus determine the number of pulses for the digits to be sent out.

With switch SW1 set to the position shown on the drawing the switches 6BS1 through 6BS10 are disabled. The switches 6GS1 through 6GS11 are now supplied with a 200 millisecond pulse from scanner 5SC2. In addition they are also supplied with a 100 millisecond pulse in common from gate 5–12. This is achieved by taking the odd numbered pulses 1, 3, 5, 7 and 9 from 5SC1 inverting them at the input to 5-13 and then again inverting at gate 5–12. But the switches 6GS1 through 6GS11 are disabled during the interval when a pulse is present at the output of scanner 5SC1 on the odd pulses of the 1 through 9 outputs. At the digit select matrix the presence of a 200 millisecond pulse for example on switch 6GS1 will pass along the horizontal to diode 6PD1 for digit 5 through switch 6SW1–8 contacts and the decoding diodes 6D14 and 6D24 into the relays 6L2 and 6H2 to supply the frequencies corresponding thereto as shown on the following table from the touch tone generator 6TT. As scanner 5SC2 scans across its outputs 1 through 11 each of the switches 6GS1 through 6GS11 will be placed in a preparatory position and in the absence of the outputs 1, 3, 5, 7 and 9 from 5SC1 there will be a pulse supplied through the plug diode to the frequency selecting relays as explained for digit 1. This sending of multifrequency digits will continue until the position set on switch ABN corresponds to the digit values or rather to the number of digits desired for a seven digit number to be outpulsed the switch would be set to the seven position. When the scanner 5SC2 output reaches the seventh pulse position gate 5–14 along with the C clock pulse will enable gate 5–14 whose output is inverted at gate 5–15 to then enable the setting of latch 9L3 of the sequence state register indicating the end of sequence state 3. At this state of the sequence of operations the equipment is preparing to test for ring back tone from the exchange. The output of sequence state register latch 9L3 is connected to gate 9–22 for resetting latch 9L2 and to gate 3-1 to prepare it for the passage of the output from the ring back tone detector 3RB. Other connections from the latch 9L3 are to gate 3-3 to enable relays 3G1 through 3G5 to connect the originating inlets to the ring back tone detector and to the call abandoned switch through gate 7–16 to possibly abort the call at this stage if the switch is set to this position and also to the ring back tone missing group of gates 7–6 through 7–10 for indicating such a condition if it should occur. The scanning of the originating lines will proceed as for the dial tone detection by the enabling successively of each of the lines by the scanner SC1 in succession and the signals will again be registered in the signal registers 4SL1 through 4SL5 or the fault registers 4FL1 through 4FL5 and proceed through the cycle until gate 9–17 is enabled to set latch 9L4. It is connected to switch 8S6 on the terminating line side. Switch 8S6 operates a relay 8OH that connects all of the terminating lines to simulate an off-hook condition. Sequence state register latch 9L4 is connected to gate 3—3 to enable switches 3S1 through 3S5 of the originating inlets and switches 8S1 through 8S5 of the terminating inlets. Both the originating and terminating lines will then be enabled successively by the scanner SC1 inputs to these switches. The transmission tone detector on the originating side will function in the same manner as the ring back or dial tone detectors. However, unlike the other two it does not have any gates to switch it through to the signal registers or the fault registers because the other two are blocked. Upon completion of this sequence is determined at gate 7–21 which enables gate 9—9 to set latch 9L5. During the interval when both latches 9L4 and 9L5 are set gate 9–15 serves to enable latch 9L7 to prepare to initiate a new cycle.

What is claimed is:

1. An automatic dialing routiner for operating and testing telephone switching equipment with a plurality of line terminals for connecting subscriber lines thereto; said routiner having; a first plurality of output lines connectable to said line terminals, a plurality of outpulsing relay means, each connected to an output line with a break contact in series with said output line, and having an operate winding, a plurality of manually settable digit selection means connected to each of said outpulsing means, each said selection means comprising a cross-wire grid having, a plurality of 10 ordinate wires each corresponding to a pulse of the number of pulses that may be transmitted for a single digit and a plurality of 11 abscissa wires each corresponding to a digit of a call number, a first pulsing means arranged to apply a pulse of digital pulse duration to each of said ordinate wires in succession, and a first plurality of diodes connected from each of said ordinate wires to said pulsing relay means operate winding, a second plurality of diodes, one of each of said second plurality of diodes arranged for connection between an ordinate wire corresponding to the value of a particular digit and an abscissa wire corresponding to the digit position in the sequence of digits, a second pulsing means arranged to apply a pulse of a total digital pulsing interval duration to each of said abscissa wires in succession, and start means operated to enable said pulsing means, said relay outpulsing means operated by said first pulsing means sequence of pulses until said sequence of pulses encounters one of said second plurality of diodes corresponding to the digit value on the ordinate wires and digit position on the abscissa wires to terminate the outpulsing sequence for a particular digit, further including a touch tone generator and a switchover means capable upon operation to disable said first pulse generator and controlling said second pulse generator to successively apply a pulse of only sufficient duration for touch calling tone application to each abscissa wire in succession and a third plurality of diodes, a group of relays corresponding respectively to each of the output frequencies of said tone generator, one of each of said diodes connecting a digitally corresponding ordinate wire to a relay winding of a digitally corresponding frequency.

2. The combination as claimed in claim 1 further including tone detection means for detecting tone signals applied to said line by said switching equipment, and means for connecting said tone detection means to each of said plurality of output lines in response to outpulsing of all programmed digits from said groups of outpulsing lines other means operated in response to a correct receipt of the tone signals to release said switching equipment.

3. The combination as claimed in claim 2 further including a second plurality of output lines connected to said line terminals, and means operated in response to access via said switching equipment from said first plurality of output lines to apply an off-hook signal to said second plurality of output lines.

4. The combination as claimed in claim 3 further including means effective after applying said off-hook signal to apply a tone signal to said second plurality of output lines, and tone detection means connected to said first plurality of output lines operated in response to said tone to release said switching equipment.

5. The combination as claimed in claim 2 further including means effective upon outpulsing of a selected number for releasing the telephone switching equipment.

6. The combination as claimed in claim 5 further including means effective after release of the switching equipment for re-seizing the switching equipment and transmitting pulses representing the same number again.

7. The combination as claimed in claim 2 further including indicator means operated upon an incorrect receipt of the tone signals.

8. An automatic dialing routiner for operating and testing telephone switching equipment with a plurality of line terminals for connecting subscriber lines thereto; said routiner having; a first plurality of output lines connectable to said line terminals, a plurality of outpulsing relay means, each connected to an output line with a break contact in series with said output line and having an operate winding, a plurality of manually settable digit selection means connected to each of said outpulsing means, each said selection means comprising a cross-wire grid having, a plurality of 10 ordinate wires each corresponding to a pulse of the number of pulses that may be transmitted for a single digit and a plurality of 11 abscissa wires each corresponding to a digit of a call number, a first pulsing means arranged to apply a pulse of digital pulse duration to each of said ordinate wires in succession, and a first plurality of diodes connected from each of said ordinate wires to said pulsing relay means operate winding, a second plurality of diodes, one of each of said second plurality of diodes arranged for connection between an ordinate wire corresponding to the value of a particular digit and an abscissa wire corresponding to the digit position in the sequence of digits, a second pulsing means arranged to apply a pulse of a total digital pulsing interval duration to each of said abscissa wires in succession, and start means operated to enable said pulsing means, said relay outpulsing means operated by said first pulsing means sequence of pulses until said sequence of pulses encounters one of said second plurality of diodes corresponding to the digit value on the ordinate wires and digit position on the abscissa wires to terminate the outpulsing sequence for a particular digit, further including a touch tone generator in series with each output line capable of applying any one of a first group of four frequencies and any one of a second group of three frequencies to said line; switchover means capable upon operation to disable said first pulse generator and controlling said second pulse generator to successively apply a pulse of only sufficient duration for touch-calling tone application to each abscissa wire in succession and a third plurality of diodes, a group of relays corresponding respectively to each of the output frequencies of said tone generator, one of each of said diodes connecting a digitally corresponding ordinate wire to a relay winding of a digitally corresponding frequency to apply tones corresponding to said setting of said second plurality of diodes.

9. The combination as claimed in claim 8 further including means effective upon outpulsing of a selected number for releasing the telephone switching equipment.

10. The combination as claimed in claim 9 further including means effective after release of the switching equipment for re-seizing the switching equipment and transmitting pulses representing the same number again.

* * * * *